Jan. 18, 1927.
J. M. JOHNSON
1,614,743
ADJUSTABLE SPOTLIGHT
Filed May 7, 1924
2 Sheets-Sheet 1
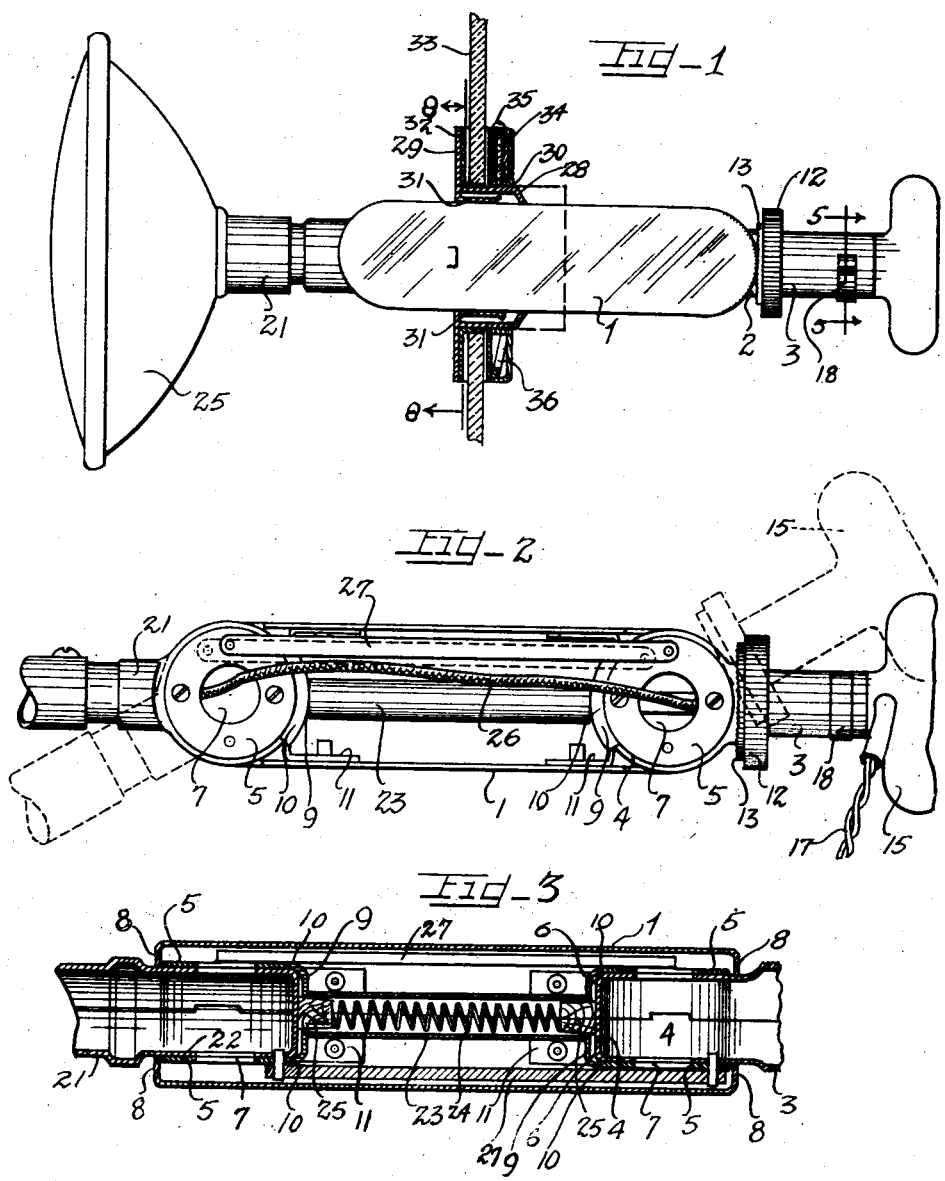
Inventor
Jay M. Johnson
by Charles W. Hill
Attys

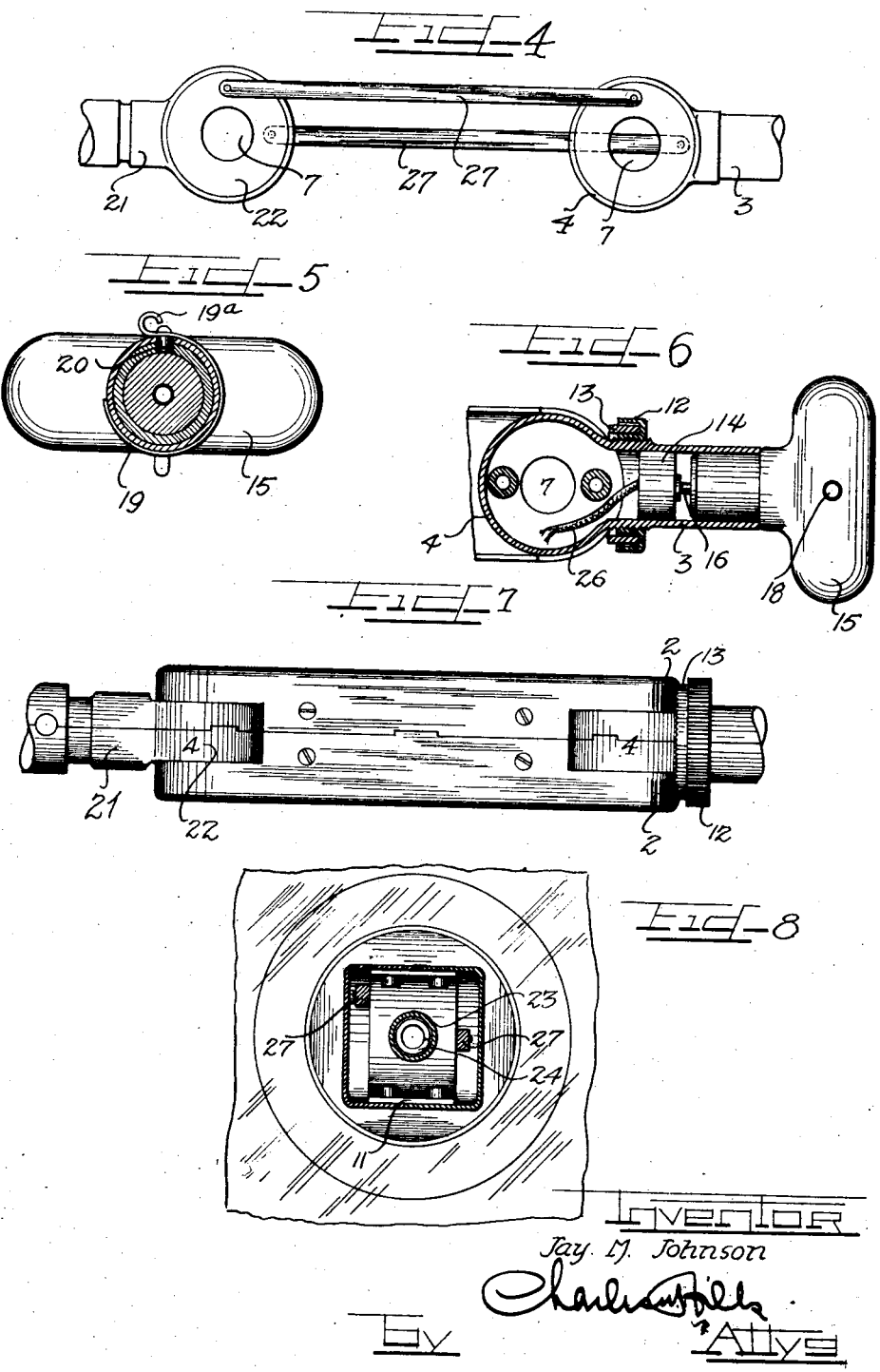

Patented Jan. 18, 1927.

1,614,743

UNITED STATES PATENT OFFICE.

JAY M. JOHNSON, OF CHICAGO, ILLINOIS, ASSIGNOR TO GREAT LAKES AUTO PRODUCTS COMPANY, A CORPORATION OF ILLINOIS.

ADJUSTABLE SPOTLIGHT.

Application filed May 7, 1924. Serial No. 711,555.

This invention relates to a spot light for automobiles and the like and comprises a mounting adapted to be removably secured in a suitable aperture in the dash or wind shield of a vehicle; the lamp or spot light being rotatably supported in said mounting and susceptible of angular adjustment with respect thereto from within the vehicle. The mounting may also be readily removed from the dash or wind shield and used for examining different parts of the car.

The invention consists of the novel structure and combinations hereinafter described and more particularly pointed out and defined in the appended claims.

In the accompanying drawings which illustrate a preferred embodiment of this invention and in which similar reference numerals refer to similar features in the different views—

Figure 1 is a sectional view through a wind shield of a motor vehicle showing the spot light and mounting with the attaching means shown in section.

Figure 2 is an enlarged plan view of the interior of the spot light mounting.

Figure 3 is an enlarged longitudinal sectional view through the spot light mounting.

Figure 4 is an elevational view of certain parts in detached form.

Figure 5 is an enlarged sectional view upon the line 5—5 of Figure 1 showing the parts in elevation.

Figure 6 is an enlarged sectional view through the operating member for the spot light showing the handle in elevation.

Figure 7 is a top plan view of the mounting with the spot light and handle broken away.

Figure 8 is a sectional view upon the line 8—8 of Figure 1.

Referring to the drawings, it will be observed that the mounting consists of a polygonal member 1 preferably made of two parts suitably secured together. The ends of this member are bifurcated and rounded or of arcuate form, the inner arcuate end being serrated as indicated at 2. An operating member comprising a hollow shank portion 3 and a cylindrical head is rotatably supported in the bifurcation of the inner end of said mounting. This operating member is preferably stamped from sheet metal into two complemental parts which are secured together; disks 5 being secured to the lateral sides of the head which is slightly bevelled upon its lateral margins as shown at 6 in Figure 3. This head is hollow and is provided with a central aperture 7 which communicates with the hollow shank 3 for a purpose that will later appear.

This head 4 is rotatably retained in the bifurcation by the marginal lips 8 of the two part mounting, and a shoe which consists of an arcuate portion 9 provided with lateral lips 10 that engage over the bevelled margins of the head and contact the disks 5. This arcuate portion has feet or flanges 11 for attachment to the upper and lower parts of the mounting.

The shank 3 of the operating member is provided with a threaded portion upon which a knurled nut 12 is threaded. This nut is provided with a serrated ring 13 adapted for interlocking engagement with the serrations 2 on the inner end of the mounting 1.

A plug 14 (Figure 6) is secured in the inner end of the shank 3 and a hollow handle 15 is removably inserted in the outer end of the shank 3, and is provided with a stud 16 adapted for contacting the plug 14. A switch not shown within the handle 15 is connected to the stud 16 and to a feed wire 17 extending into the handle through an aperture 18.

In order to removably secure the handle 15 to the shank 3, there is provided a spring band 19 (Figure 5) which is secured to the shank with one end 19ᵃ free to be moved or sprung outwardly for releasing the stud 20 that it carries and that engages in suitable apertures in the shank 3 and handle 15.

In the bifurcation at the other end of the mounting 1 there is pivoted the supporting member 21 for the spot light. This spot light supporting member is preferably made from a complemental pair of sheet metal members to provide a hollow space therein through which the wire for the light may extend. The inner end of the member 21 is provided with a head 22 of substantially circular formation very similar to the head 4 on the operating shank, and it is provided with a lateral opening 7. The lateral sides of the head 22 are also provided with disks 5 as in the case of the head 4. The head 22 is secured for pivotal movement by the end lips 8 of the bifurcation and by the lips 10 of a shoe 9 as described in connection with the head 9. Between the shoes 9 there is a hollow spacing tube 23 in which a coil spring 24 is mounted. The ends of this spring abut wooden blocks 25 which extend through suitable apertures in the shoes and contact the peripheries of the rotatable heads 4 and 22. Consequently these heads 4 and 22 are yieldingly confined in their sockets or bifurcations to eliminate rattling, and have frictional holding means which tend to hold the parts in adjusted position before the interlocking ring 13 is brought into action.

The head light 25 is suitably supported upon the member 1. The feed wires 26 for the light extend from the aforementioned plug 14 through the aperture 7 of the head 4, then into the aperture 7 of the head 22 and into the hollow supporting member 21. It may be connected to the spot light in any well known way.

The heads 4 and 22 are connected for conjoint pivotal movement by means of a pair of connecting rods 27. These rods are so connected to the heads that when one is on dead center, the other will not be, as shown in Figure 4. Consequently, it will always be easy to tilt the spot light. In the drawing, the pivot points of the rods 27 are shown as spaced substantially 90° from each other.

In order to secure the mounting in a dash or wind shield, there is provided a bearing embodying a member 28 having an outer cylindrical periphery which is provided with a rising annular flange 29 upon one side and a threaded portion 30 spaced therefrom. The interior of the member 28 is of polygonal form to slidingly receive the mounting 1. Resilient tongues 31 are preferably provided in connection with said member for bearing against the sides of the mounting to prevent rattling. A flanged washer 32 is preferably seated against the flange 29 for supporting the wind shield pane 33 which is confined between said washer and a nut 34 screwed upon the aforementioned threaded portion 30 and confined by a set screw 35, a suitable washer and a spring 36 being interposed between the nut 34 and pane 33. The member 28 is susceptible of rotating within the flanged washer 32 in order that the spot light may be rotated.

In the operating of this spot light, it is only necessary to loosen the knurled nut 12 and swing the handle 15 up or down to tilt the spot light as desired. The same may then be rotated by turning the mounting 1 which as just described is rotatably mounted in the aperture in the wind shield. Accordingly it is possible to adjust the spot light to any angle, and it may be directed at a right angle to the longitudinal axis of the mounting and rotated so that house numbers may be readily observed. The handle 15 and the nut 34 may be removed, allowing the mounting to be readily removed from the wind shield. The handle 15 may then be applied to the removed mounting and the spot light used to examine any parts of the car according to the length of the cable 17.

From the foregoing, it will be apparent, that a novel form of spot light mounting has been provided which may be readily adjusted to any desired angle and which may be removed from the supporting dash or windshield and used to inspect or repair parts of the automobile or vehicle.

I am aware that numerous details of construction may be varied without departing from the principles of this invention and I therefore do not purpose limiting the patent granted otherwise than as indicated by the terminology of the claims.

I claim as my invention:

1. In a device of the class described, an elongated lamp mounting, a stem having a head pivotally mounted in each end of said mounting, lamp secured to one stem, a handle attached to the other stem, means connecting said heads for conjoint pivotal movement, and a serrated member threaded upon the handle stem and adapted for locking engagement with serrations on the adjacent end of the mounting.

2. In a device of the class described, an elongated lamp mounting, a stem having a head pivotally mounted in each end of said mounting, yielding means acting on said heads, a lamp secured to one stem, a removable handle attached to the other stem, and means connecting said heads for conjoint pivotal movement.

3. In a device of the class described, an elongated lamp mounting, a stem having a head pivotally mounted in each end of said mounting, a lamp secured to one stem, a handle attached to the other stem, means connecting said heads for conjoint pivotal movement, friction blocks contacting with said heads, a tube engaging the inner ends of said blocks, and a coiled spring disposed in said tube and exerting its tension upon said blocks to force them into frictional contact with said heads.

In testimony whereof I have hereunto subscribed my name.

JAY M. JOHNSON.